US011619344B2

(12) United States Patent
Zhao et al.

(10) Patent No.: US 11,619,344 B2
(45) Date of Patent: Apr. 4, 2023

(54) ELEVATION DEVICE AND ROBOT (71) Applicant: UBTECH ROBOTICS CORP LTD, Shenzhen (CN)

(72) Inventors: Yongjin Zhao, Shenzhen (CN); Wenhua Yu, Shenzhen (CN); Libing Zhou, Shenzhen (CN); Junxin Mou, Shenzhen (CN); Jialin Qin, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 115 days.

(21) Appl. No.: 17/243,523

(22) Filed: Apr. 28, 2021

(65) Prior Publication Data

US 2021/0341099 A1    Nov. 4, 2021

(30) Foreign Application Priority Data

Apr. 30, 2020  (CN) .......................... 202010361954.0

(51) Int. Cl.
*F16M 11/00* (2006.01)
*F16M 13/02* (2006.01)
*B25J 9/12* (2006.01)
*F16H 25/20* (2006.01)
*F16M 11/04* (2006.01)
*F16M 11/18* (2006.01)

(52) U.S. Cl.
CPC ............ *F16M 13/022* (2013.01); *B25J 9/126* (2013.01); *F16H 25/20* (2013.01); *F16M 11/046* (2013.01); *F16M 11/18* (2013.01); *F16H 2025/204* (2013.01); *F16H 2025/2075* (2013.01)

(58) Field of Classification Search
CPC .... F16M 13/022; F16M 11/046; F16M 11/18; B25J 9/126; F16H 25/20
See application file for complete search history.

(56) References Cited

U.S. PATENT DOCUMENTS

| 4,708,512 A * | 11/1987 | Allert ........................ D01H 7/04 24/285 |
| 2007/0247858 A1* | 10/2007 | Ford ...................... F21V 21/088 362/382 |
| 2017/0023177 A1* | 1/2017 | Yomogita ............... F16H 25/20 |
| 2019/0120407 A1* | 4/2019 | Huovila ................... A61G 5/00 |
| 2019/0368583 A1* | 12/2019 | Higuchi .................. F16H 25/20 |
| 2020/0096082 A1* | 3/2020 | Song ........................ F16H 25/24 |

(Continued)

FOREIGN PATENT DOCUMENTS

| CN | 109179259 A | 1/2019 |
| CN | 109879203 A | 6/2019 |
| CN | 209970526 U | 1/2020 |

*Primary Examiner* — Amy J. Sterling (57) ABSTRACT

An elevation device includes a mounting frame, a rotary actuator fixed to the mounting frame, a shaft connected to the rotary actuator and rotatable with respect to the mounting frame, a drive bar slidably connected to the mounting frame, and a connecting member fixed to the shaft. The shaft defines a helical groove in a lateral surface thereof. The drive bar includes a post that is movably fit in the helical groove. The mounting frame, the shaft and the drive bar constitute a conversion mechanism that converts rotation of the shaft into linear motion of the drive bar. The drive bar is slidable with respect to the mounting frame along a direction that is parallel to an axis of rotation of the shaft.

18 Claims, 6 Drawing Sheets

(56) References Cited

U.S. PATENT DOCUMENTS

| | | |
|---|---|---|
| 2020/0141474 A1* | 5/2020 | Lim .................... F16H 25/20 |
| 2020/0145522 A1* | 5/2020 | Liu .................... F16M 11/14 |
| 2021/0161632 A1* | 6/2021 | Ganeswaran ......... G06F 1/1632 |
| 2022/0203905 A1* | 6/2022 | Kazempour .............. F16B 1/00 |

* cited by examiner

ELEVATION DEVICE AND ROBOT

CROSS REFERENCE TO RELATED APPLICATIONS

This application claims priority to Chinese Patent Application No. 202010361954.0, filed Apr. 30, 2020, which is hereby incorporated by reference herein as if set forth in its entirety.

BACKGROUND

1. Technical Field

The present disclosure generally relates to robots, and particularly to an elevation device and a robot having the same.

2. Description of Related Art

A radar is a core device for inspection robots to detect the external environment for navigation. The radar devices of some conventional inspection robots are exposed to the external environment without a shield. This arrangement may adversely affect the service life of the radar devices. In order to solve this problem, some inspection robots are equipped with an elevation device to drive the radar devices back into the inspection robots.

Although the conventional elevation devices can satisfy basic needs, it is useful and desirable to provide a new elevation device that is simple in structure.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
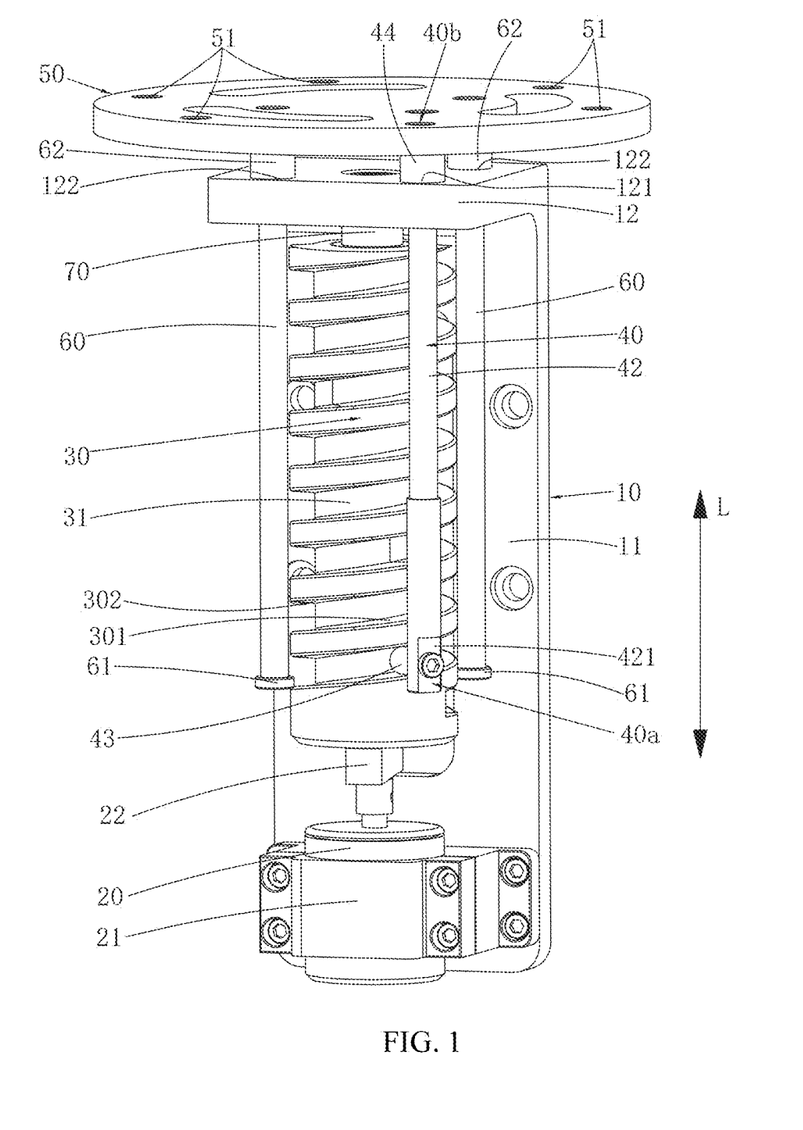
FIG. 1 is a schematic isometric view of an elevation device according to one embodiment.
Figure 2:
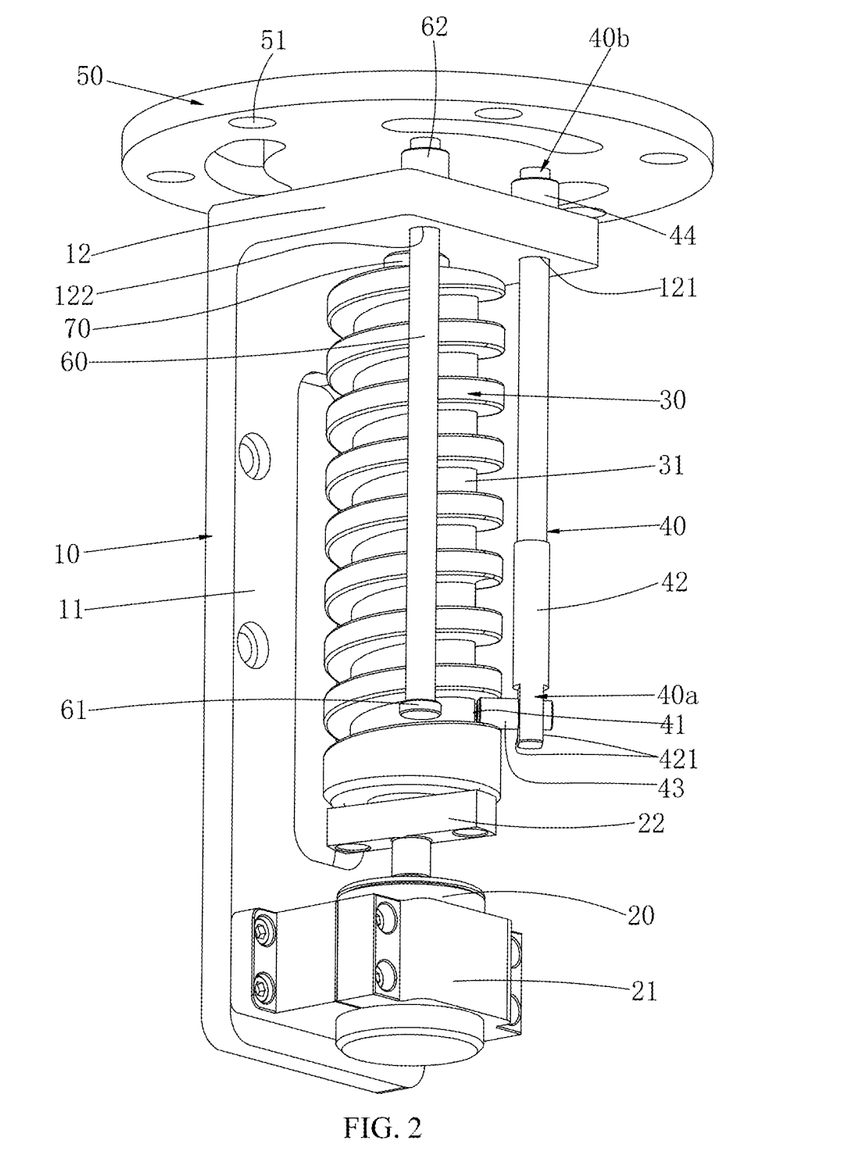
FIG. 2 is similar to FIG. 1, but viewed from a different perspective.
Figure 4:
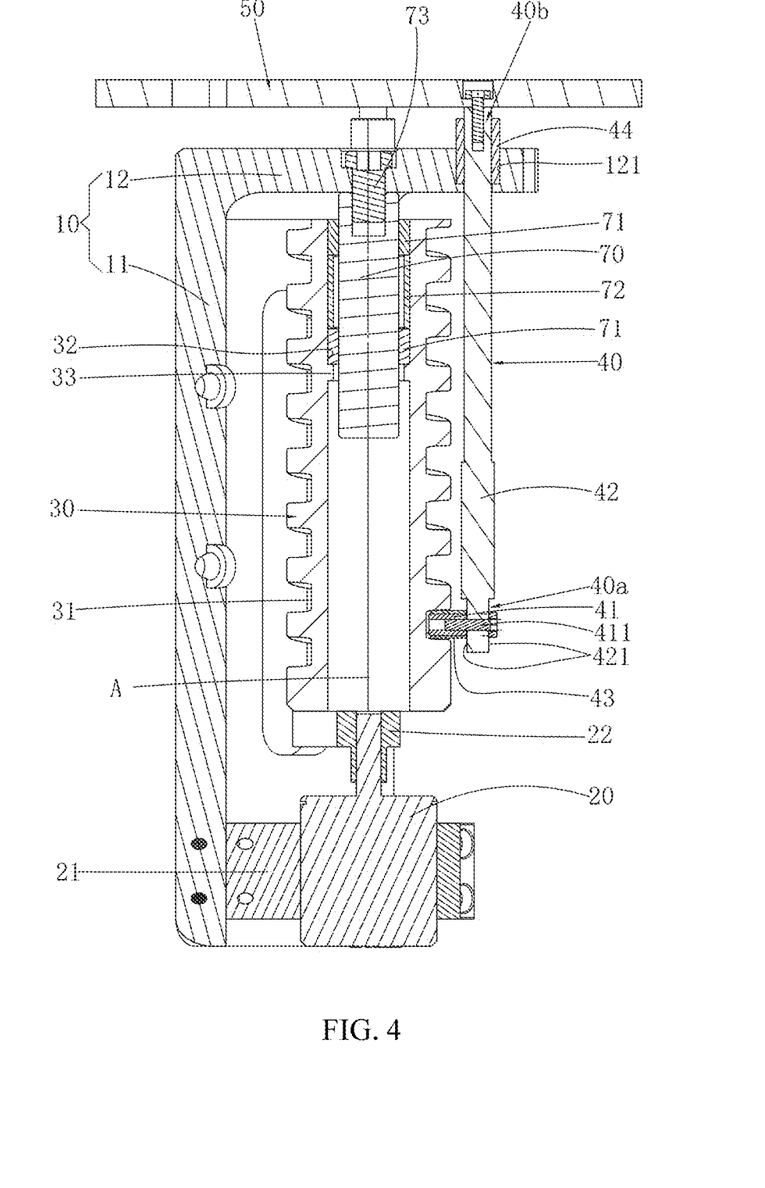
FIG. 4 is a cross-sectional view of the elevation device.

Referring to FIGS. 1, 2, and 4, an elevation device according to one embodiment may be applied in an environment where a component is required to be retracted into a desired position when the component is not in use. For example, the elevation device may be mounted on the body of an automatic inspection robot to move a component up and down. The component may be a lidar. The elevation device may include a mounting frame 10, a rotary actuator 20, a shaft 30, a drive bar 40, and a connecting member 50. The rotary actuator 20 can be mounted on the mounting frame 10 to actuate movement of the shaft 30. The rotary actuator 20 can be an electric motor, which is convenient for controlling the output displacement. The shaft 30 is able to rotate when driven by the rotary actuator 20, and defines a helical groove 31 in a lateral surface thereof. The drive bar 40 is slidably connected to the mounting frame 10. The drive bar includes a post 41 at an end 40a thereof. The post 41 is movably fit in the helical groove 31. The mounting frame 10, the shaft 30 and the drive bar 40 constitute a conversion mechanism that converts rotation of the shaft 30 into linear motion of the drive bar 40. The drive bar 40 is slidable with respect to the mounting frame 10 along a direction (as indicated by the arrow line L) that is parallel to an axis of rotation A (see FIG. 4) of the shaft 30. The connecting member 50 is configured to connect with the component, and is fixed to an end 40b of the driving bar 40 that is opposite the end 40a.

With the mounting frame 10, the shaft 30 and the drive bar 40 constituting the conversion mechanism, the elevation device is simple in structure with compact size. As a modular structure, the elevation device can be quickly installed to the place where the lifting function is required. For example, it can be installed in the body of the automatic inspection robots to move a certain component up to an upper position when in use and move the component down to a lower position such that the component can be shielded/protected.

In one embodiment, the elevation device further includes at least one guiding bar 60 slidably connected to the mounting frame 10. The at least one guiding bar 60 is parallel to the drive bar 40, and one end of the at least one guiding bar 60 is fixed to the connecting member 50. The provision of the guide bar 60 enables the drive bar 40 to slide more stably relative to the mounting frame 10, thereby enabling the connecting member 50 connected to the drive bar 40 and the component fixed to the connecting member 50 to move up and down smoothly, thereby improving the reliability of the elevation device. Both the cam rod 40 and the guide rod 60 can be connected to the connecting member 50 by fasteners or other conventional connection techniques.

In one embodiment, the elevation device further includes at least one sliding bearing 62. The mounting frame 10 defines at least one bearing hole 122 to receive the at least one sliding bearing 62. The at least one guiding bar 60 is slidably connected to the mounting frame 10 through the at least one sliding bearing 62. Serving as a guide rail structure, the first sliding bearing 62 can reduce the friction between the guide bar 60 and its contact surface during linear motion, which allows the guide bar 60 to slide more smoothly relative to the mounting frame 10, thereby ensuring the stability during motion of the at least one guiding bar 60.

In one embodiment, the at least one guiding bar 60 includes a limiting block 61 at an end opposite the connecting member 50. The limiting block 50 is configured to come into contact with the mounting frame 10 to stop motion of the at least one guiding bar 60. The at least one guide bar 60 passes through the at least one bearing hole 122 and can move up and down along the axis of the at least one bearing hole 122. The size of the limiting block 61 is greater than the inner diameter of the at least one bearing hole 122. When the connecting member 50 moves up, the at least one guiding bar 60 moves up together with the connecting member 50 until the limiting block 61 abuts against the mounting frame 10. At this time, the mounting frame 10 stops the at least one guiding bar 60 from continuing to move. The maximum range of motion of the connecting member 50 is determined by the position of the limiting block 61 on the at least one guiding bar 60.

In one embodiment, the at least one guiding bar 60 is two in number. The drive bar 40 is arrange between the two guiding bars 60. With such configuration, the connecting member 50, the drive bar 40 and the guiding bars 60 can slide more stably relative to the mounting member 10, the situation that the drive bar 40 and the guiding bars 60 do not move smoothly due to the machining errors and/or assembly errors, which allows for simple structure and reduced cost.

Referring to FIGS. 2 and 4, in one embodiment, the post 41 can be fixed to one end of the shank body 42 of the drive bar 40 by a fastener 411, which allows for easy connection of the post 41 to the drive bar 40. The lateral surface of the shank body 42 of the drive bar 40 is provided with two mounting surfaces 421 that are opposite each other. One end of the post 41 abuts against one of the mounting surfaces 421 and the head of the fastener 411 abuts against the other of the mounting surfaces 421.

Referring to FIGS. 1-4, in one embodiment, the elevation device further includes a sleeve 43 arranged around the post 41 and rollable in the helical groove 31. When the drive bar 30 rotates, the lower surface 301 or the upper surface 302 of the spiral groove 31 exerts a force on the post 41 along the axial direction of the drive bar 30, and the sleeve 43 can rotate relative to the post 41. There is rolling friction between the sleeve 43 and the lower surface and/or lower surface of the spiral groove 31. The resistance from the lower surface and/or lower surface of the spiral groove 31 is thus small, which facilitates smooth movement of the post 41 and the sleeve 43 in the helical groove 31. The sleeve 43 can be made of copper or other materials with good wear resistance to reduce the wear between the sleeve 43 and the upper surface and/or lower surface of the helical groove 31 of the drive bar 30 and improve the smoothness of movement. The outer diameter of the sleeve 43 is substantially equal to the axial width of the spiral groove 31 of the drive bar 30, which prevents the sleeve 43 from moving up and down in the helical groove 31 and allows the sleeve 43 to roll along the helical groove 31. This arrangement facilitates accurate transmission of the rotation of the shaft 30 to the sleeve 43, thereby driving the drive bar 40 to accurately move up and down. The axial width of the helical groove 31 refers to the axial distance between the upper surface 302 and the lower surface 301 of the helical groove 31. It should be noted that outer diameter of the post 41 is substantially equal to the axial width of the spiral groove 31 of the shaft 30 when the sleeve 43 is omitted. This arrangement prevents the post 41 from moving up and down in the helical groove 31 and allows the post 41 to move along the helical groove 31, which facilitates accurate transmission of the rotation of the shaft 30 to the post 41, thereby driving the drive bar 40 to accurately move up and down.

In one embodiment, the sleeve 43 has a lubricating layer on its outer surface, which facilitates the lubrication between the sleeve 43 and the upper surface and/or lower surface of the helical groove 31, as well as the lubrication between the sleeve 43 and the post 41, thereby reducing the friction, and facilitating movement of the post 41 and the sleeve 43 in the helical groove 31. The lubricating layer can be lubricating grease that is not volatile and easy to be maintained within the gap between the components above.

Figure 5:
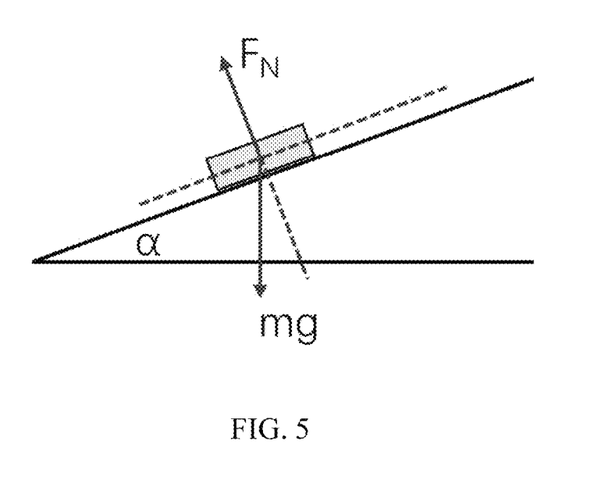
FIG. 5 is an equivalent model for calculating parameters that achieve self-locking of the connecting member of the elevation device.
Figure 6:
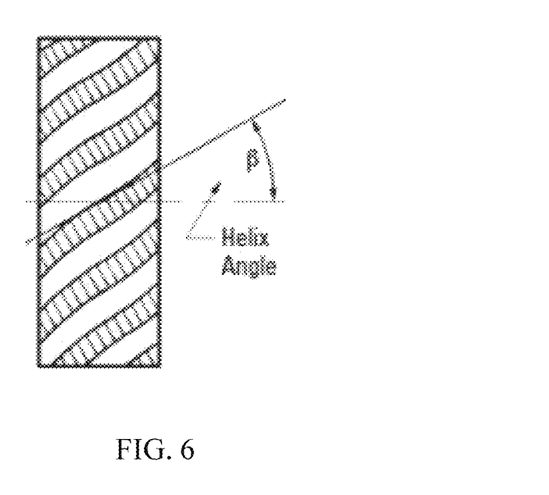
FIG. 6 is a schematic diagram of a shaft of the elevation device.

Referring to FIGS. 4 and 5, the position difference of the component that is driven by the elevation device, which is caused by vibration, has a great impact on its normal operation. Thus, the floating tolerance of the connecting member 50, (i.e., the difference between the actual position and the ideal desired position) should be extremely small. A self-locking solution is thus provided to achieve the objective. In one embodiment, an unfolding helix angle (see FIG. 6) of the helical groove 31 in an area away from the rotatory actuator 20 and a coefficient of friction between the sleeve 43 and an inner surface of the helical groove 31 satisfy an inequation below: $\mu > \tan(\beta)$, where $\mu$ represents the coefficient of friction between the sleeve 43 and the inner surface of the helical groove 31, and $\beta$ represents unfolding helix angle of the helical groove 31 in an area away from the rotatory actuator 20. During operation, the rotary actuator 20 drives the shaft 30 to rotate, and the drive bar 40 and the connecting member 50 will move upwards. When the sleeve 43 moves to the upper end of the shaft 30, self-locking occurs between the sleeve 43 and the inner surface of the helical groove 31. The drive bar 40, the connecting member 50 and the component that is driven by the elevation device is held in position. At this time, the rotary actuator 20 can also achieve position retention when power is off. The drive bar 40, the post 41, the sleeve 43, the connecting member 50, and the helical groove 31 can be equivalent to a slope and sliding block model as shown in FIG. 5. The lower surface of the spiral groove 31 becomes an inclined surface after unfolding. The drive bar 40, the post 41, the sleeve 43, the connecting member 50, and the component that is driven by the elevation device are equivalent to a sliding block. $F_N$ is the supporting force of the inclined surface to the equivalent sliding block, $m_g$ is the gravity of the equivalent sliding block, and $\alpha$ is the inclination angle of the inclined surface. The conditions for the equivalent sliding block not to slide down are determined according to formulas as follows: $mg \cdot \sin \alpha > \mu mg \cdot \cos \alpha$; $\alpha > \arctan(\mu)$, where $\mu$ is the coefficient of friction, and $\arctan(\mu)$ is the friction angle. When $\alpha$ is less than $\arctan(\mu)$, the component force of gravity along the inclined surface is always balanced with static friction and is less than the maximum static friction, the equivalent sliding block will not slide and realize self-locking.

In one embodiment, the friction coefficient is selected to be 0.5, and the corresponding friction angle is 26.6°, so the unfolding helix angle of the helical groove 31 is not more than 26.6°. In one embodiment, the comprehensive safety factor value is 1.5, so the unfolding helix angle of spiral groove 31 is selected to be 18°. With such configuration, the shaft 30 will not rotate due to the downward pressure of the weight of the component that is driven by the elevation device or the downward pressure caused by external impact. At this time, when the power of the rotary actuator 20 is cut off, the component that is driven by the elevation device will not move downward.

Figure 3:
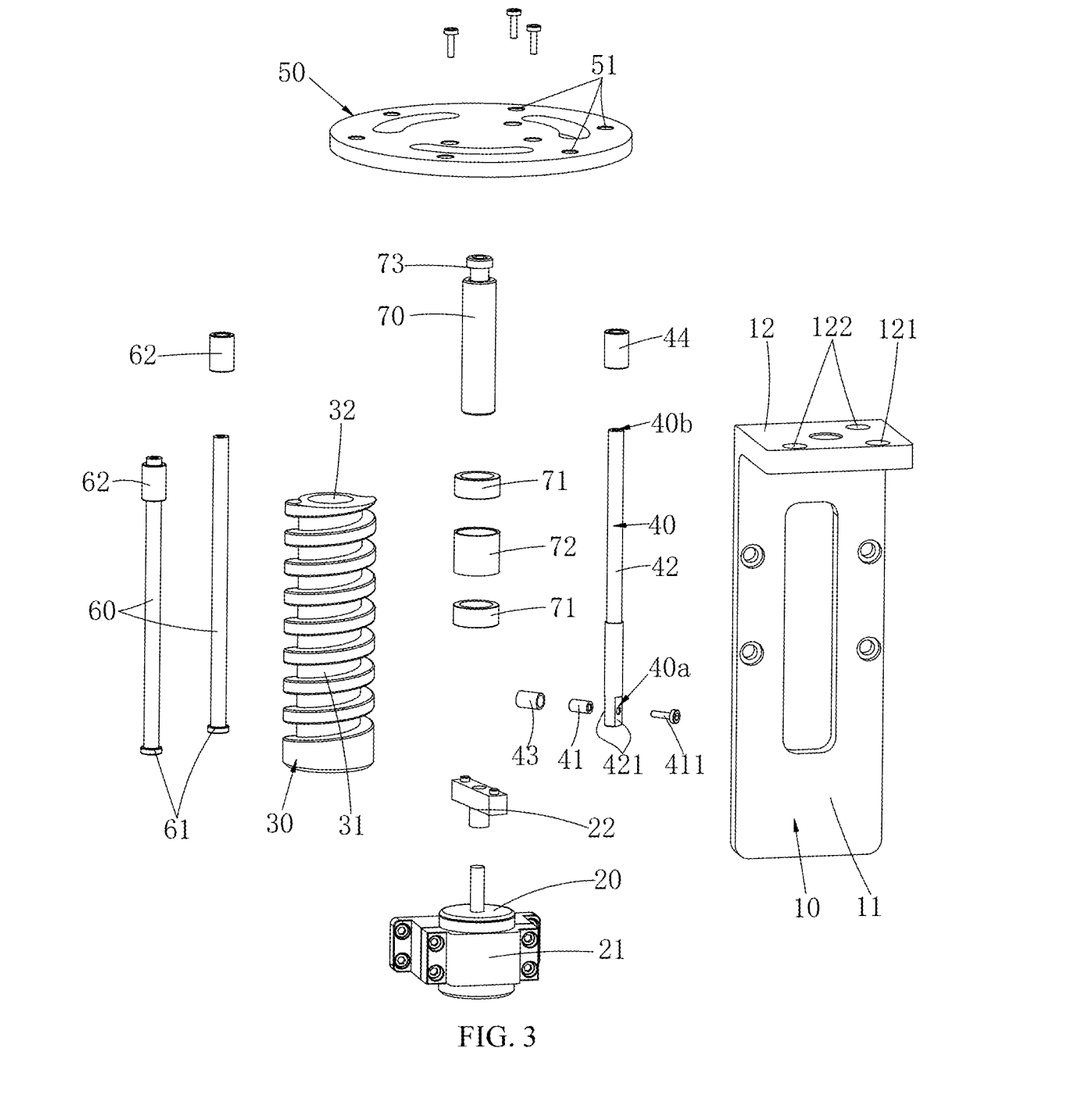
FIG. 3 is a schematic isometric exploded view of the elevation device.

Referring to FIGS. 3 and 4, in one embodiment, the elevation device further includes an axle 70 fixed to the mounting frame 10 and at least one rotating bearing 71. The axle 70 may be fixe to the mounting frame 10 by a fastener 73 or by welding. The shaft 30 is hollow and defines a receiving hole 32, and the at least one rotating bearing 71 is fit in the receiving hole 32. The axle 70 passes through the at least one rotating bearing 71 and partly extends into the receiving hole 32. The shaft 30 is rotatably connected to the mounting frame 10 by engagement of the axle 70 with the at least one rotating bearing 71. Such an arrangement can make full use of the axial space of the lifting device and reduce the axial size of the overall structure. The at least one rotating bearing 71 is provided to enable the shaft 30 to be smoothly and rotatably mounted on the mounting frame 10 and supported by the axle 70. The inner surface of the helical groove 31 of the shaft 30 provides a force along the axial direction of the shaft 30 to the post 41 of the drive bar 40 so that the shaft 40 and the connecting member 50 move smoothly.

Referring to FIG. 4, in one embodiment, a protruding ring 33 protrudes from an inner surface of the receiving hole 32, and one of the at least one rotating bearing 71 rests on the protruding ring. The protruding ring 33 serves as a positioning means to axially position the one of the at least one rotating bearing 71.

Referring to FIGS. 3 and 4, in one embodiment, the at least one rotating bearing 71 is two in number. The elevation device further includes a spacing sleeve 72 arranged around the axle 70 and received in the receiving hole 32. The spacing sleeve 72 is arranged between and abuts against the two rotating bearings 71. The rotating bearings 71 are provided such that the shaft 30 can be stably rotatably mounted on the axle 70. The spacing sleeve 72 is provided to limit the axial positions of the two rotating bearings 71.

Referring to FIGS. 1-3, in one embodiment, the elevation device further includes a sliding bearing 44. The mounting frame 10 defines a bearing hole 121 to receive the sliding bearing 44, and the drive bar 40 is slidably connected to the mounting frame 10 through the sliding bearing 44. The second sliding bearing 44 is provided to facilitate the stable sliding installation of the drive bar 40 on the mounting frame 10 and reduce the friction between the drive bar 40 and the external contact surface.

Referring to FIGS. 1-4, in one embodiment, the mounting frame 10 includes a base plate 11 and an end plate 12 protruding from an end of the base plate 11. The rotary actuator 20 is fixed to the base plate 11, and the drive bar 40 passes through the end plate 12. The base plate 11 can be fixed to an external structure by using fasteners, for example, to the body of a robot. The shaft 30 is arranged in the area enclosed by the base plate 11 and the end plate 12, so that the structure is compact. The axle 70 is fixed to the end plate 12. The end plate 12 is provided with a bearing hole 121 through which the drive bar 40 passes, and two bearing holes 122 through which the guiding bars 60 pass. The axes of the bearing hole 121 and the bearing holes 122 are parallel to each other. In this way, the axes of the drive bar 40, the guiding bar 60 and the shaft 30 are parallel to each other.

Referring to FIGS. 1-3, in one embodiment, the connecting member 50 defines a number of connecting holes 51 for fasteners to pass through such that different external components can be fixed to the connecting member 50. When assembling, the holes of an external component are aligned with the mounting holes 51 of the connecting member 50, and the external component can then be fixe to the connecting member 50 by fasteners passing through the mounting holes 51. Different external components may have different hole arrangements, and the connecting member 50 is configured with different mounting holes 51 to adapt to different external components, which improves the compatibility with different external components.

Referring to FIGS. 1-3, in one embodiment, the elevation device may further include a fixing member 21 for fixing the rotary actuator 20 to the mounting frame 10. The fixing member 21 may be fixed to the mounting frame 10 by fasteners. The output shaft of the rotatory actuator 20 and the shaft 30 are connected to each other by a connecting member 22 to transmit the mechanical power of the rotary actuator 20 to the shaft 30. A speed reducer may be arranged between the rotary actuator 20 and the shaft 30 to reduce the rotation speed and increase the torque, so as to provide desired mechanical power to the cam 30.

A robot according to one embodiment includes the elevation device as described in the embodiments above, and a component that is driven by the elevation device. The robot may be an automatic inspection robot and the component may be a lidar. The elevation device can be arranged in the body of the automatic inspection robot to move the lidar up to an upper position when in use and move the lidar down to a lower position such that the lidar can be shielded/protected.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. An elevation device comprising:
    a mounting frame;
    a rotary actuator fixed to the mounting frame;
    a shaft connected to the rotary actuator and rotatable with respect to the mounting frame, the shaft defining a helical groove in a lateral surface thereof;
    a drive bar slidably connected to the mounting frame, the drive bar comprising a post that is movably fit in the helical groove, the mounting frame, the shaft and the drive bar constituting a conversion mechanism that converts rotation of the shaft into linear motion of the drive bar, wherein the drive bar is slidable with respect to the mounting frame along a direction that is parallel to an axis of rotation of the shaft;
    a connecting member fixed to the drive bar; and
    a sleeve arranged around the post, wherein the sleeve is rollable in the helical groove.

2. The elevation device of claim 1, further comprising at least one guiding bar slidably connected to the mounting frame, wherein the at least one guiding bar is parallel to the drive bar, and one end of the at least one guiding bar is fixed to the connecting member.

3. The elevation device of claim 2, further comprising at least one sliding bearing, wherein the mounting frame defines at least one bearing hole to receive the at least one sliding bearing, and the at least one guiding bar is slidably connected to the mounting frame through the at least one sliding bearing.

4. The elevation device of claim 2, wherein the at least one guiding bar comprises a limiting block at an end opposite the connecting member, and the limiting block is configured to come into contact with the mounting frame to stop motion of the at least one guiding bar.

5. The elevation device of claim 2, wherein the at least one guiding bar is two in number.

6. The elevation device of claim 1, wherein the sleeve comprises a lubricating layer on an outer surface thereof.

7. The elevation device of claim 1, wherein an unfolding helix angle of the helical groove in an area away from the rotatory actuator and a coefficient of friction between the sleeve and an inner surface of the helical groove satisfy an inequation below: $\mu > \tan(\beta)$, where $\mu$ represents the coefficient of friction between the sleeve and the inner surface of the helical groove, and $\beta$ represents unfolding helix angle of the helical groove in an area away from the rotatory actuator.

8. The elevation device of claim 1, further comprising an axle fixed to the mounting frame and at least one rotating bearing, wherein the shaft is hollow and defines a receiving hole, the at least one rotating bearing is fit in the receiving hole, the axle passes through the at least one rotating bearing and partly extends into the receiving hole, the shaft is rotatably connected to the mounting frame by engagement of the axle with the at least one rotating bearing.

9. The elevation device of claim 8, wherein a protruding ring protrudes from an inner surface of the receiving hole, and one of the at least one rotating bearing rests on the protruding ring.

10. The elevation device of claim 8, further comprising a spacing sleeve arranged around the axle and received in the receiving hole, wherein the at least one rotating bearing is two in number, and the spacing sleeve is arranged between and abuts against the two rotating bearings.

11. The elevation device of claim 1, further comprising a sliding bearing, wherein the mounting frame defines a bearing hole to receive the sliding bearing, and the drive bar is slidably connected to the mounting frame through the sliding bearing.

12. The elevation device of claim 1, wherein the mounting frame comprises a base plate and an end plate protruding from an end of the base plate, wherein the rotary actuator is fixed to the base plate, and the drive bar passes through the end plate.

13. The elevation device of claim 1, wherein the connecting member defines a plurality of connecting holes.

14. A robot comprises:
an elevation device comprising:
a mounting frame;
a rotary actuator fixed to the mounting frame;
a shaft connected to the rotary actuator and rotatable with respect to the mounting frame, the shaft defines a helical groove in a lateral surface thereof;
a drive bar slidably connected to the mounting frame, the drive bar comprising a post that is movably fit in the helical groove, the mounting frame, the shaft and the drive bar constating a conversion mechanism that converts rotation of the shaft into linear motion of the drive bar, wherein the drive bar is slidable with respect to the mounting frame along a direction that is parallel to an axis of rotation of the shaft;
a connecting member fixed to the drive bar; and
a sleeve arranged around the post, wherein the sleeve is rollable in the helical groove.

15. The robot of claim 14, further comprising at least one guiding bar slidably connected to the mounting frame, wherein the at least one guiding bar is parallel to the drive bar, and one end of the at least one guiding bar is fixed to the connecting member.

16. The robot of claim 15, further comprising at least one sliding bearing, wherein the mounting frame defines at least one bearing hole to receive the at least one sliding bearing, and the at least one guiding bar is slidably connected to the mounting frame through the at least one sliding bearing.

17. The robot of claim 15, wherein the at least one guiding bar comprises a limiting block at an end opposite the connecting member, and the limiting block is configured to come into contact with the mounting frame to stop motion of the at least one guiding bar.

18. The robot of claim 14, wherein an unfolding helix angle of the helical groove in an area away from the rotatory actuator and a coefficient of friction between the sleeve and an inner surface of the helical groove satisfy an inequation below: $\mu > \tan(\beta)$, where $\mu$ represents the coefficient of friction between the sleeve and the inner surface of the helical groove, and $\beta$ represents unfolding helix angle of the helical groove in an area away from the rotatory actuator.

* * * * *